United States Patent
Linke et al.

(10) Patent No.: US 11,338,496 B2
(45) Date of Patent: May 24, 2022

(54) METHOD AND DEVICE FOR PRODUCING CONTAINERS FROM THERMOPLASTIC MATERIAL

(71) Applicant: KHS GmbH, Dortmund (DE)

(72) Inventors: Michael Linke, Hamburg (DE); Rolf Baumgarte, Ahrensburg (DE); Frank Berger, Barsbüttel (DE); Deniz Ulutürk, Hamburg (DE); Jens-Peter Rasch, Ahrensburg (DE); Arne Wiese, Ahrensburg (DE); Bernd Zimmering, Hamburg (DE); Thomas Herold, Bargfeld-Stegen (DE); André Gerkens, Ahrensburg (DE); Frank Haesendonckx, Hamburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/643,885

(22) PCT Filed: Sep. 6, 2018

(86) PCT No.: PCT/EP2018/074021
§ 371 (c)(1),
(2) Date: Mar. 3, 2020

(87) PCT Pub. No.: WO2019/048552
PCT Pub. Date: Mar. 14, 2019

(65) Prior Publication Data
US 2020/0262129 A1     Aug. 20, 2020

(30) Foreign Application Priority Data

Sep. 10, 2017   (DE) .................... 10 2017 120 863.1

(51) Int. Cl.
*B29C 49/78*     (2006.01)
*B29C 49/12*     (2006.01)
(Continued)

(52) U.S. Cl.
CPC ............ *B29C 49/786* (2013.01); *B29C 49/12* (2013.01); *B29C 49/36* (2013.01);
(Continued)

(58) Field of Classification Search
CPC ....... B29C 49/786; B29C 49/12; B29C 49/36; B29C 49/4289; B29C 2949/78663; B29K 2101/12; B29L 2031/7158
See application file for complete search history.

(56) References Cited

U.S. PATENT DOCUMENTS

| | | |
|---|---|---|
| 4,076,071 A | 2/1978 | Rosenkranz et al. |
| 5,346,386 A | 9/1994 | Albrecht et al. |
| 5,648,026 A | 7/1997 | Weiss |
| 7,914,726 B2 | 3/2011 | Andison et al. |

(Continued)

FOREIGN PATENT DOCUMENTS

| | | |
|---|---|---|
| CN | 103547511 A | 1/2014 |
| CN | 105711063 A | 6/2016 |

(Continued)

OTHER PUBLICATIONS

International Search Report dated Dec. 19, 2018 filed in PCT/EP2018/074021.

*Primary Examiner* — Matthew J Daniels
*Assistant Examiner* — Shibin Liang
(74) *Attorney, Agent, or Firm* — Rankin, Hill & Clark LLP

(57) ABSTRACT

The invention relates to a method for producing containers (14) from preforms (12) made of thermoplastic material by means of a blow molding machine (10) comprising at least one temperature control device (26) and one forming device having at least two forming stations (16), wherein the preforms (12) are temperature controlled by means of the temperature control device (26) on the basis of specifiable first control parameters, and wherein one temperature-controlled preform (12) is formed by means of one of the (Continued)

Figure 1:
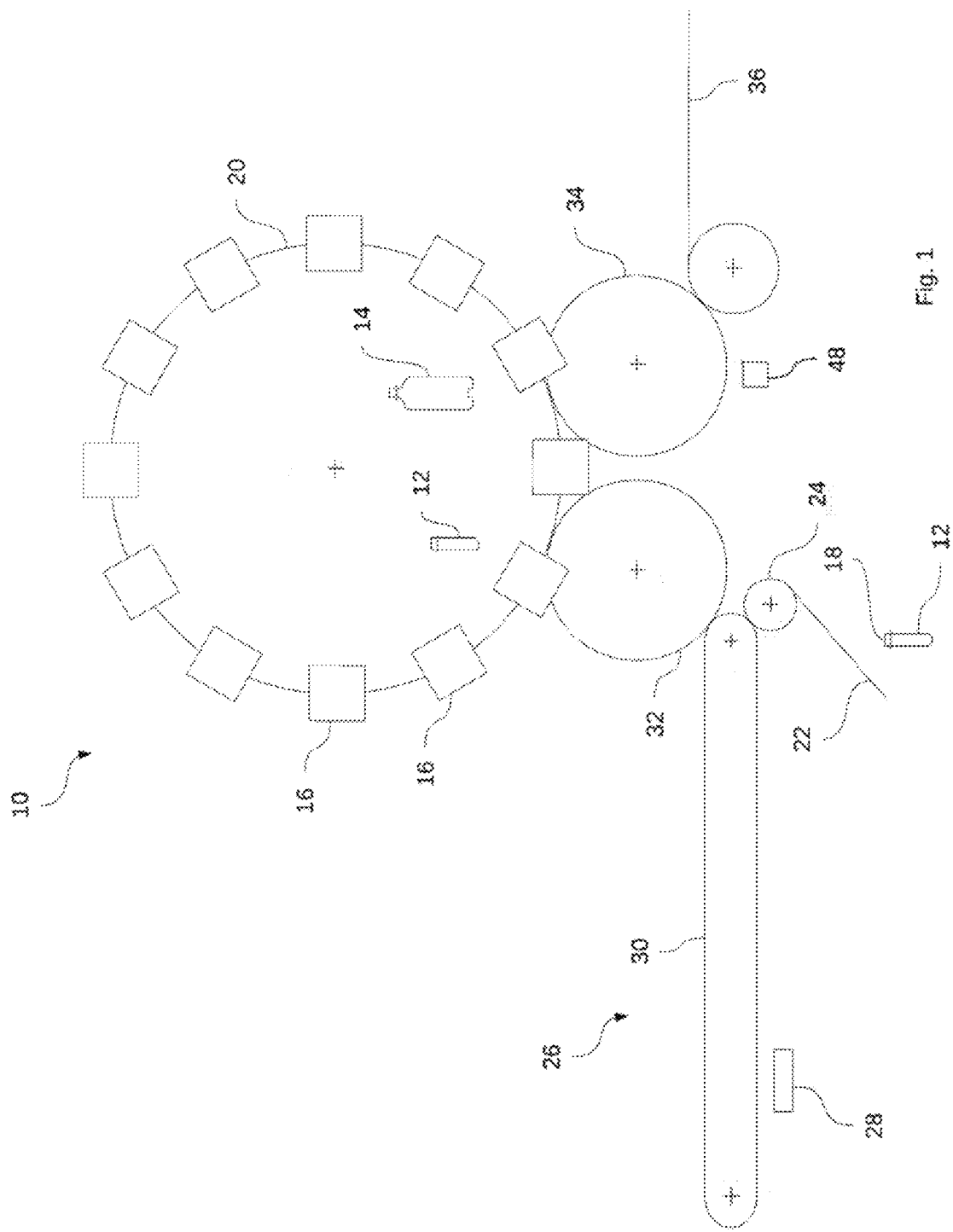

forming stations (16), respectively, on the basis of specifiable second control parameters into a container (14), wherein at least one of the second control parameters is individually specified for each of the forming stations (16). The invention furthermore relates to a blow molding machine (10), designed for executing the method according to the invention, for producing containers (14) from preforms (12) made of thermoplastic material.

12 Claims, 2 Drawing Sheets

(51) Int. Cl.
    *B29C 49/36*     (2006.01)
    *B29C 49/42*     (2006.01)
    *B29K 101/12*     (2006.01)
    *B29L 31/00*     (2006.01)

(52) U.S. Cl.
    CPC .............. *B29C 49/4289* (2013.01); *B29C 2949/78663* (2013.01); *B29K 2101/12* (2013.01); *B29L 2031/7158* (2013.01)

(56) References Cited

U.S. PATENT DOCUMENTS

| | | | |
|---|---|---|---|
| 10,343,326 B2 * | 7/2019 | Knapp | B29C 49/12 |
| 10,489,263 B2 | 11/2019 | Grimm | |
| 2008/0164642 A1 * | 7/2008 | Hirdina | B29C 49/783 |
| | | | 264/528 |
| 2009/0108505 A1 | 4/2009 | Steiner | |
| 2012/0266567 A1 | 10/2012 | Haesendonckx et al. | |
| 2014/0237944 A1 | 8/2014 | Hahn | |
| 2014/0298100 A1 | 10/2014 | Grimm | |
| 2015/0037518 A1 | 2/2015 | Haner et al. | |
| 2016/0176099 A1 | 6/2016 | Knapp et al. | |
| 2019/0168438 A1 * | 6/2019 | Morikami | B29C 49/06 |

FOREIGN PATENT DOCUMENTS

| | | | |
|---|---|---|---|
| DE | 2352926 A1 | 4/1975 | |
| DE | 4212583 A1 | 10/1993 | |
| DE | 4340291 A1 | 6/1995 | |
| DE | 10116665 A1 | 10/2002 | |
| DE | 102010007541 A1 | 6/2011 | |
| DE | 102011017448 A1 | 10/2012 | |
| EP | 2835248 A2 | 2/2015 | |
| EP | 3037242 A1 | 6/2016 | |
| EP | 2763904 B1 | 3/2017 | |
| WO | 2018003256 | * 1/2018 | B29C 49/12 |

* cited by examiner

METHOD AND DEVICE FOR PRODUCING CONTAINERS FROM THERMOPLASTIC MATERIAL

The invention relates to a method for producing containers from thermoplastic material by means of a blow molding machine having at least one temperature control device and one forming device having at least two forming stations and a blow molding machine for producing containers from preforms made of thermoplastic material having at least one temperature control device for temperature controlling the preforms and one forming device having at least two forming stations for forming one temperature controlled preform, respectively, into a container.

The production of containers by blow molding from preforms made of a thermoplastic material, for example, from preforms made of PET (polyethylene terephthalate), is known, wherein the preforms are supplied to different processing stations within a blow molding machine (DE 4340291 A1). A blow molding machine typically comprises a temperature control device for the temperature control and/or thermal conditioning of the preforms and a blowing device having at least one blowing station referred to as a forming station, in the region of which the respective previously temperature-controlled preform is expanded to form a container. The expansion is performed with the aid of a compressed gas (generally compressed air) as a forming fluid or pressure medium, which is introduced at a molding pressure into the preforms to be expanded. The method sequence in the case of such an expansion of the preform is explained, for example, in DE 4340291 A1. The fundamental structure of a blowing station is described, for example, in DE 4212583 A1. Possibilities for the temperature control of the preform are explained, for example, in DE 2352926 A1. Temperature control or thermal conditioning is understood in this case to mean that the preform is heated to a temperature suitable for the blow molding and possibly a temperature profile adapted to the contour of the container to be produced, for example, is applied to the preform. The blow molding of containers from preforms with additional use of a stretching rod is also known.

Producing containers, in particular in the form of bottles, from thermally-conditioned or temperature-controlled preforms and filling them simultaneously with a liquid filling material in this case is also known from the prior art. The filling material is supplied in this case as a hydraulic forming fluid or pressure medium for expanding the preform and/or for forming the container at a forming and filling pressure, so that the respective preform is formed into the container simultaneously with the filling. Assisting this forming by way of the use of a stretching rod is also known here. Such methods, in which simultaneous molding and filling of the respective container is performed, can also be referred to as a hydraulic forming method or as hydraulic container molding. Corresponding devices are also referred to as forming-filling facilities or forming-filling machines.

In the case of molding of the container from the preform by the filling material itself, i.e., using the filling material as a hydraulic pressure medium, only one machine is still required for the molding and filling of the container, which has an increased level of complexity for this purpose, however. One example of such a machine is disclosed in U.S. Pat. No. 7,914,726 B2. A further example is disclosed in DE 102010007541 A1.

One important quality requirement in the case of container molding using a device which comprises multiple forming stations is to produce the most identical containers possible using the various forming stations, which containers have no deviations or only deviations within narrow tolerance limits from one another in the container properties thereof such as the material distribution of the container wall. Components or assemblies of each forming station influencing the forming process have a substantial influence on the container properties. Such assemblies influencing the forming process are, for example, the controllable valves, using which the forming fluid is introduced under pressure into the preform and—if provided—the stretching rod, which is introduced into the preform for stretching and guiding. Even slight differences of the process-relevant properties between the forming stations can already result in disturbingly large differences in the wall thickness distribution of the containers produced using different forming stations in this case. Such process-relevant properties can be, for example, the opening or closing behavior of the valves or different bearing frictions of the stretching rod. The differences in this way in the process sequence of the container forming at various forming stations are thus to be attributed to deviations in the component characteristics between the respective relevant assemblies of the forming stations.

It is problematic that every component of the forming stations defining the forming process, such as the controllable valves of a forming station in particular, already has a separate component characteristic in specific tolerance limits related to production. The component characteristic of a valve can relate, for example, to the individual specific reaction time of the valve to a switching pulse of a control unit. To keep deviations, for example, the switching characteristics between the valves of different forming stations, as small as possible, the valves used are typically produced with the highest possible precision to thus maintain very narrow tolerance limits in the manufacturing of the valves and therefore obtain nearly identical valves. The remaining assemblies essentially defining the molding process are also produced correspondingly precisely, such as the stretching rod and the associated bearings and drivetrain, to avoid deviations in the component characteristics. The high precision in the production of the assemblies is complex and correspondingly expensive.

In addition, even with very precise production of the individual components or assemblies, different aging behavior of equivalent components or assemblies can furthermore occur and thus different wear states can result in a variance increasing over the usage duration between the containers produced using different forming stations.

The object on which the invention is based is to provide a method and a device for producing containers which enable the variance between the containers produced using different forming stations to be kept as small as possible.

This object is achieved by a method and a device having the features disclosed herein.

According to the invention, a method is provided for producing containers from preforms made of thermoplastic material by means of a blow molding machine comprising at least one temperature control device and one forming device having at least two forming stations, wherein the preforms are temperature controlled by means of the temperature control device on the basis of pre-definable first control parameters, and wherein one temperature-controlled preform, respectively is formed by means of a forming station on the basis of pre-definable second control parameters into a container, wherein at least one of the second control parameters is individually specified for each of the forming stations.

The first control parameters are generally often also referred to as heating parameters. These are, for example, power parameters or temperature parameters for radiant heaters or groups of radiant heaters in the temperature control device. Other possible first control parameters are, for example, power parameters or speed parameters for a fan for surface cooling of the preforms within the temperature control device.

The second control parameters according to the invention are also often described as blowing parameters. In this case, these include, for example, control parameters for the stretching rod movement, including but not exclusively power parameters or speed parameters, velocity parameters, or also distance-time parameters. Other exemplary second control parameters relate to the supply of the blowing fluid, for example, switching parameters or setting parameters for valves or pressure parameters for pressurized fluid sources.

The above listing of first control parameters and second control parameters is to be understood in this case in the scope of the invention as expressly by way of example and not exhaustive.

In the scope of the invention, control parameters are in particular the values and/or signals which are exchanged between a higher-level machine controller and the respective components/assemblies to control or regulate the method-relevant components and/or assemblies. The machine controller is in this case in particular hierarchically superior to possibly provided control electronics or control devices of the components and/or assemblies.

Control parameters for controlling the individual forming stations of a blow molding machine are typically specified globally, i.e., identically for all forming stations, so that every forming station receives the same control commands. Such control commands can be, for example, switching commands for the opening or closing of valves or switching commands for the activation or deactivation of a stretching rod drive. It is to be noted in this case that in rotary machines, in which the forming stations are arranged distributed on the circumference of a working wheel, the control commands dependent on the control parameters are typically emitted offset in time, in particular in dependence on the revolution velocity of the working wheel, to the respective assemblies, for example, the valves or stretching rod drives of the individual forming stations.

Under ideal conditions, in which there are no structural or function-related differences between the individual forming stations of the container production machine, a global specification of control parameters results in identical container molding processes in every forming station and thus in identical containers having identical container properties. Under real conditions, however, differences exist between the individual forming stations, which result in different container molding processes in various forming stations. The containers produced using different forming stations thus have different container properties. In particular in the case of very thin-walled containers or containers having a complex profile geometry, desired variances often can no longer be obtained using a global setting of the control parameters, however.

It is therefore proposed according to the invention that at least one of the control parameters for controlling assemblies influencing the forming process, such as valves or stretching rod drives, be specified individually by station. The station-specific individual specification of control parameters according to the invention enables a control of individual assemblies or components adapted to each individual one of the forming stations, which results in a significantly improved possibility for the reduction of the variance in the container quality between the containers produced using different forming stations.

In this case, in the scope of the invention, all second control parameters, i.e., in particular all control parameters influencing the forming process running in the forming stations, can be specified individually by station. For some control parameters, however, this embodiment of the invention requires significant additional expenditure for machine construction.

Without negatively affecting the basic concept according to the invention, in the scope of the invention, individual second control parameters can therefore also be specified station-comprehensively, i.e., for in each case one group of forming stations or for all forming stations. In particular control parameters for components or assemblies which are each associated with multiple or all forming stations, for example compressors and/or throttle valves for providing forming fluid at a specified pressure level, are suitable for a station-comprehensive specification.

The invention also comprises embodiments in which a part of the control parameters are also specified station-comprehensively for those components or assemblies which are provided in each individual forming station. For example, it is conceivable to specify the control parameters for the stretching drive of the forming stations station-comprehensively and to specify the control parameters for the valves of the forming stations station-individually. A simple control is thus also ensured, as well as an adequate station-by-station optimization of the chronological interaction of stretching movement and blowing fluid supply.

This station-by-station individual specification of control parameters for a blow molding machine is claimed. In this case, conventional (air) blow molding machines are considered in the foreground, in which the preforms are formed into containers at the individual forming stations pneumatically, i.e., with introduction of a gaseous forming fluid. However, a blow molding machine can also be understood in the scope of the invention as a forming-filling device, in which the preforms are formed into containers hydraulically, i.e., with introduction of a liquid forming fluid. The liquid forming fluid is typically a filling material in this case, which remains in the container. Both machine types comprise assemblies or components at the forming stations, for example valves or stretching units, which are similarly subject to production-related differences and thus come into consideration for a forming-station-individual specification of control parameters.

The station-individual control of the individual forming stations by specification of individual or station-specific control parameters thus enables in a simple manner the station-by-station adaptation of the forming processes and thus the setting of the container properties of the containers produced using specific forming stations. The variance in the container quality between the containers produced using the various forming stations may thus be reduced.

In one preferred design, it is intended that at least one property of a finished container is metrologically acquired, and in consideration of the acquired property, the individual second control parameters for the forming station used for forming the relevant container are suitably specified in order to influence the relevant property for containers molded subsequently in the same forming station with regard to desired container specifications.

Inferences can be drawn about the grade and quality of containers produced using specific forming stations by the metrological acquisition of properties, such as a material distribution of the container wall or a wall thickness at specific wall sections of the container in particular. These inferences may be derived, for example, in a simple manner by a comparison of the acquired properties to reference properties. If deviations are established between the acquired property and the reference value, the control parameters of the respective forming station influencing this property can be suitably adapted to achieve an improvement of the container quality. By way of an unambiguous association of the measured finished containers with the forming station which was used for the production of this container, the control parameters which are provided for controlling the specific forming station can be provided in a targeted manner.

It is ensured in particular by the consideration of the properties of previously produced containers in the specification of the individual control parameters that the advantages of the invention also result over a longer period of time. In particular, deviations between the forming stations, which result due to different wear behavior between equivalent assemblies of different forming stations over time, may thus also be equalized.

The container specifications influenced by a targeted change of the second control parameters can relate to target values or target intervals for objective properties such as material distribution or section weights, i.e., weight masses of different regions of the container, but also subjective properties such as haptics or optics of the container.

It is fundamentally conceivable to carry out the metrological acquisition of properties of finished containers after removal of the container to be acquired from a transport flow, which is also referred to as offline measurement in technical circles. In the case of an offline measurement, not all containers are inspected, but rather containers can be removed according to a specified distribution. It is important in this case that the removed containers can be associated with the forming station which was used to produce the container. This is generally possible without problems by a number being provided in the respective molds of the forming station which is molded during the production of the container and thus remains permanently recognizable. If the containers removed from the transport flow are not incorporated back into the transport flow, in addition to nondestructive measuring methods, destructive measuring methods can also be carried out, such as burst tests or cutting up the container and weighing the individual sections thus obtained.

In one preferred design, it is intended that the property of the containers is continuously acquired. In a continuous acquisition, the containers are in particular inspected nondestructively and without loss in the continuous transport flow. Experts also refer to inline measurements here. The measuring devices provided for this purpose can be arranged, for example, along the transport flow after removal of the container from the forming station up to the outward transfer from the container production device. It is important in this case that the inspected container can be associated with the forming station which was used to produce the container.

It is fundamentally conceivable that the metrologically acquired properties of the finished containers are used for the monitoring and possibly for the manual change of control parameters, i.e., in particular carried out by an operator of the device. However, it is preferably provided that possibly required adaptations of the control parameters are automatically carried out after a machine comparison to a reference property.

According to one preferred embodiment, it can therefore be provided that the acquired property is compared to a reference property and the individual second parameters are regulated in a closed control loop on the basis of the comparison between the acquired property and the reference property.

Automatic regulation of the control parameters is advantageous in particular because short-term and/or minor deviations in the container quality may thus also be equalized by a targeted intervention in the station-individual control parameters. Thus, for example, not only wear-related or other long-term effects may be compensated for, but rather also short-term disturbances acting on the forming process, for example, changes in the ambient temperature or in the ambient humidity.

It is furthermore preferably provided that in addition to the individual second control parameters, at least one of the remaining second parameters and/or the first control parameters is also regulated in the control loop. The remaining second control parameters are understood in particular as the control parameters for the forming stations which are not specifically specified individually by forming station, but rather comprehensively for the forming stations, i.e., control parameters which are specified for a group of multiple selected forming stations or for all forming stations. This increases the flexibility in the machine control, which particularly assists the needs-oriented control and regulation of the device.

In addition to the regulation of the second control parameters provided for controlling the forming stations, it is moreover also provided in a further embodiment of the invention that the first control parameters provided for controlling the temperature control device of the blow molding machine be regulated in a closed control loop. Inter alfa, the first control parameters can comprise specifications for control signals for setting heating elements or cooling elements of a temperature control device.

Various component parts come into consideration as components or assemblies to be controlled of a forming station. In particular, it is provided that the individual second control parameters comprise control parameters for pre-blowing valves of the forming stations and/or control parameters for main blowing valves of the forming stations and/or control parameters for stretching drives of the forming stations and/or control parameters for throttle valves of the forming stations.

With respect to the inspected properties of the containers, which are used in particular for monitoring the container quality and adapting the control parameters, it is primarily provided that at least one metrologically acquired property of the finished container is a wall thickness or a wall thickness distribution or a section weight of the container.

The container properties which are accessible to an inline measurement also include, by way of example, a material density, a crystallinity of the stretched PET material, or geometric parameters of the finished containers, for example, the location of the so-called injection point.

All inline measurements can also be performed as an offline measurement, of course, while some container properties can generally only be acquired by means of offline measurement. These include, for example, burst pressure (maximum internal pressure) or top load (maximum vertical force), since the container is generally destroyed during the corresponding measurements. Properties such as thickness tests or barrier properties can generally also only be implemented as an offline measurement, since sufficiently fast measuring methods are not available.

The properties listed above are expressly to be understood as by way of example and not restrictive.

The individual specification according to the invention of control parameters relating to the forming stations also permits, in addition to the needs-based control of various components of the stations, a simple analysis of the changes of the control parameters over time, to thus obtain an indicator of the present wear state of the forming stations and/or individual assemblies of the forming stations. In one advantageous design, is therefore intended that the time curve of at least one of the individual second control parameters is acquired for a forming station, and a possible change of a component characteristic of a component of the forming station associated with the at least one control parameter is derived from the time curve of the at least one control parameter.

It is moreover advantageous, for establishing maintenance intervals or dates as needed or for scheduling maintenance work oriented to the wear speed of individual assemblies of the various forming stations, if the derived change of the component characteristic is extrapolated to estimate the future development of the component characteristic, wherein in particular maintenance or replacement of the relevant component is scheduled based on the extrapolation.

The inventive concept underlying this design is intended to obtain an item of information as to whether a maintenance intervention is possibly necessary from the different behaviors of the various stations and in particular from the control and/or regulating history of the different stations. Anomalies are thus sought in particular. If, for example, one of the multiple blowing stations requires noticeably differing control values in relation to other blowing stations, this could be used as an indicator of an imminent failure.

The extrapolation of the change of the characteristics of components or assemblies of the forming stations primarily enables an improved estimation accuracy as to when deviations between the individual forming stations will occur with a certain probability in operation of the container production machine, which deviations can no longer be equalized by an individual specification of the control parameters, for example. The extrapolation additionally also enables an estimation as to when an observed assembly will reach a wear state which, with a defined probability, could cause a failure of the forming station and thus a machine shutdown.

In addition to a very good predictability as to when the variance of the container quality between the containers produced using different forming stations will, with a defined probability, exceed a defined tolerance limit, this precise estimation of the component change also enables the utilization of the longest possible usage duration of the individual components or assemblies. The replacement intervals of wear components, for example, the valves of the forming station, have heretofore been established in such a way that even in the case of an unexpectedly above-average high level of wear of an assembly of a forming station, a failure of the forming station and thus an unexpected production gap does not occur. The safety interval to the probable failure of the forming station components was thus selected to be very high. The replacement date was established specifically by assembly, so that after reaching the replacement date, components of the same type were replaced notwithstanding the actual wear state thereof. This procedure had the result that assemblies were also regularly replaced which were subject to a below-average level of wear and would thus have still been usable for a long time. The replacement interval can be established significantly more accurately by the extrapolation according to the invention. The components can thus be replaced purposefully "on demand".

For example, to minimize as early as possible such differences in the container molding between the various forming stations induced by production-related deviations between equivalent components or assemblies of various forming stations, according to a further preferred design, it can be provided that selected assemblies defining the molding process are inspected with respect to the intended function thereof before the installation and the forming station, to thus determine an individual component characteristic of the component or the assembly. In particular, it is intended in this case that the forming stations each comprise at least one valve, wherein a valve characteristic of the valve is determined before installation of the valve in the forming station, in order to obtain an initial value to specify an individual second control parameter associated with the valve. Alternatively, it is conceivable that standard parameters are used as the initial value for specifying an individual control parameter associated with the valve.

The inventive concept underlying this design is directed to measuring each valve in its characteristic and taking the measurement result into consideration in control technology by assigning a somewhat shifted switching pulse/switching point in time to each valve in dependence on its characteristic. Varying response times from valve to valve may thus be taken into consideration, without the valves having to be produced particularly complexly. The valves can thus be embodied more cost-effectively and the comparatively high variance from valve to valve is taken into consideration in the control by storing the characteristic ascertained for the respective valve. This can be performed automatically in that bus-capable valves are used and the required values of the characteristic are stored in the valve and are available to the controller via the bus.

The valve characteristic to be determined can thus in particular be the switching characteristic, wherein the switching characteristic can be in particular the switching delay. For example, the latency between switching pulse and reaching the desired valve setting is considered with respect to the switching delay.

Moreover, a blow molding machine for producing containers from preforms made of thermoplastic material comprising at least one temperature control device for temperature controlling the preforms and one forming device having at least two forming stations for forming one temperature-controlled preform, respectively, into a container is according to the invention, wherein the blow molding machine comprises a control unit for controlling and/or regulating the temperature control device and the forming device, and wherein the control unit is configured and designed to execute an above-described method.

Advantages, details, and possible designs of the blow molding machine according to the invention result not only from the following statements but rather also from the above explanations of the method according to the invention.

In one advantageous design, it is intended that the forming stations each comprise at least one valve, wherein the valve comprises a valve control unit which is connectable via a bus connection to the control unit, wherein in particular the valve control unit comprises a memory for data on an individual valve characteristic.

In particular, specifications on the switching behavior and on switching times can be stored in a memory of the valve control unit of the bus-capable valves. These data can be stored in the memory, for example, after a producer-side determination or after a user-side determination of the valve characteristic. It can be provided in particular that the control unit of the blow molding machine accesses the data of the valves to derive a control parameter associated with the valve therefrom and to use it for a station-specific specification.

It is particularly advantageous if suitable data are already provided in the memory upon the installation of the valve into the forming station. Such data can be ascertained, for example, by means of test measurements on the valve and ensure that the individual control of the valve required for producing perfect-quality containers is enabled immediately after installation, without firstly lower-quality containers having to be produced and analyzed.

In a further advantageous design, it can be provided that the blow molding machine comprises at least one sensor for the continuous metrological acquisition of at least one property of a finished container. This fundamentally enables an automatic, regulation-based operation of the blow molding machine, which can ensure the optimum achievable container quality in each case even in the event of unpredicted disturbances acting on the process.

A property acquired using the sensor is in this case, for example, the wall thickness or a wall thickness distribution of the container.

A metrological acquisition of a specific wall thickness or a wall thickness of the finished container can be performed, for example, using so-called wall thickness sensors which operate, for example, optically or using sound waves.

Figure 2:
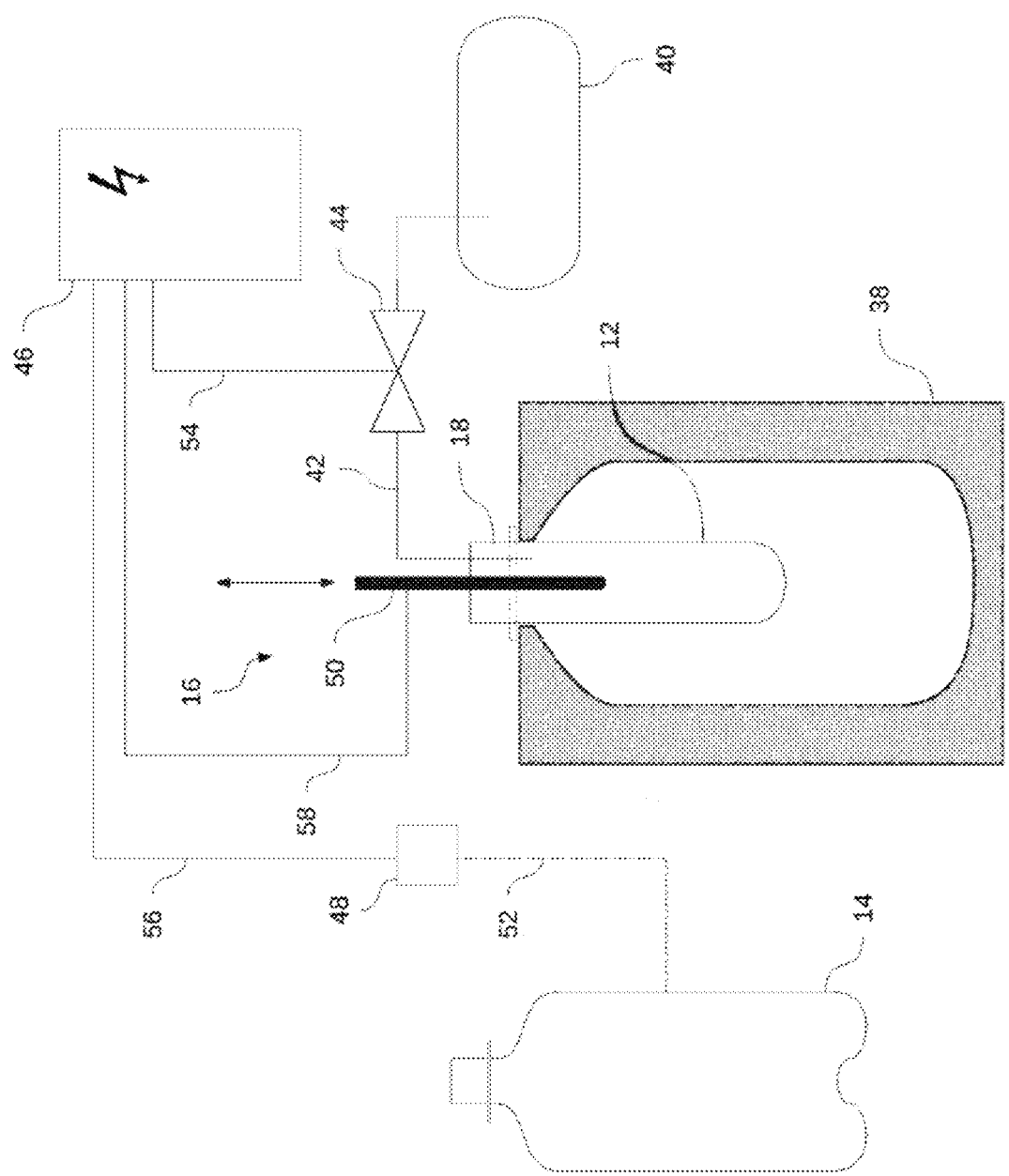

Further advantages, features, and details of the invention result from the exemplary embodiments described hereafter with reference to schematic drawings. In the figures:

FIG. 1 shows a very schematic illustration of a blow molding machine according to the invention, and FIG. 2 shows a very schematic illustration of various components of a forming station of a blow molding machine according to the invention.

The structure known in principle from the prior art of a device 10 for producing a container from preforms made of thermoplastic is illustrated in FIG. 1. The illustration shows the preferred design of such a device 10 in the manner of a rotation machine having a rotating working wheel 20 supporting at least two forming stations 16. Preforms 12 are formed by biaxial expansion into containers 14 in the region of the forming stations 16.

In a typical design, a generic device 10 for producing a container 14 contains a temperature control device 26 for the thermal conditioning of the preforms 12. As shown in the present case, the temperature control device 26 can be positioned upstream of the working wheel 20, so that the preforms 12 can be heated before reaching the forming stations 16. Schematically shown preforms 12, which can also be referred to as blanks, can be continuously supplied to a temperature control device 26 by a supply unit 22 using a transfer wheel 24. In the region of the temperature control device 26, in which the preforms 12 are transported along a heating line and are thermally conditioned at the same time, the preforms 12 can be transported depending on the application, for example, having the orifice sections 18 thereof upward in the vertical direction or downward in the vertical direction.

The temperature control device 26 is equipped, for example, with heating elements 28, which are arranged along a transport unit 30 to form the heating line. For example, a circulating conveyor chain having transport spikes for holding the preforms 12 can be used as the transport unit 30. For example, infrared radiators (IR radiators) or light-emitting diodes or near-infrared radiators (NIR radiators) are suitable as heating elements 28. Since such temperature control devices are known in manifold types in the prior art and the design details of the temperature control device are not essential to the present invention, a more detailed description can be omitted and reference can be made to the prior art, in particular to the prior art for temperature control devices of blow molding and stretch blow molding machines.

After a sufficient temperature control, also called thermal conditioning, the preforms 12 are transferred from a transfer wheel 32 to a working wheel 20 which is rotatably arranged, i.e., drivable to revolve around a vertical machine axis, or to forming stations 16 which are arranged distributed on the circumference on the working wheel 20. The working wheel 20 is equipped with a plurality, i.e., at least two such forming stations 16. For the biaxial expansion of the preforms 12 in the region of the forming stations 16, the preforms 12 are filled with a pressurized forming fluid. A gas or liquid can be used as the forming fluid.

In hydraulically forming blow molding machines, so-called forming-filling machines, both forming of the preforms 12 into the schematically shown containers 14 and also filling of the containers 14 using the provided filling material take place in the region of the forming stations 16. The molding of each container 14 is preferably performed in forming-filling machines simultaneously with the filling, wherein the filling material is used as a forming fluid, i.e., as a pressure medium for the molding. In pneumatically forming blow molding and stretch blow molding machines, the preforms 12 are filled in the region of the forming stations 16 with a blowing gas, which is also used as a pressure medium for the molding.

The working wheel 20 continuously revolves at a desired circumferential velocity in production operation. During one revolution, the insertion of a preform 12 into a forming station 16, the expansion of the preform 12 to form a container 14, and the removal of the container 12 from the forming station 16 take place. If the device according to the invention is designed as a forming-filling machine, a filling of the container 14 with a filling material also takes place simultaneously on the working wheel 20, in particular in the region of the forming stations 16. The forming stations 16 can comprise a stretching rod, which is insertable into the preform 12 to assist the axial stretching and guiding. If the forming stations 16 comprise a stretching rod, stretching of the preforms 12 also takes place simultaneously during a revolution of the working wheel 20.

After the molding and possibly the filling of the container 14 in the region of the working wheel 20, the containers 14 are removed from the working wheel 20 by a removal wheel 34, transported further, and supplied to an output line 36. Before the outward transfer of the containers 14 from the blow molding machine 10, the containers 14 are preferably transported into a region of a sensor 48 which sensorially acquires at least some, preferably all containers 14 continuously, i.e., in an inline measuring method, to metrologically acquire at least one property, such as a material distribution of the container wall. As indicated in the present case, the sensor 48 can be arranged between the working wheel 20 and the output region 36 in the region of the removal wheel 34.

Different thermoplastic materials can be used as the material for the preforms 12. Polyethylene terephthalate (PET), polyethylene (PE), polyethylene naphthalate (PEN), or polypropylene (PP) are mentioned by way of example. The dimensioning and the weight of the preforms 12 are adapted to the size, the weight, and/or to the design of the containers 14 to be produced.

Handling of the preforms 12 and/or the containers 14 is preferably carried out using tongs and/or clamping spikes or mandrels to be applied at least in regions from the inside or from the outside to the orifice section 18. Such handling means are also well-known from the prior art and therefore do not require a more detailed description.

FIG. 2 shows selected components of a blow molding station 16 in very schematic illustration in interaction with a control unit 46, which controls and/or regulates the forming process of the forming station 16, and a sensor 48 for acquiring properties of a container 14 manufactured using the forming station 16.

FIG. 2 shows a blow mold 38 of the forming station 16 having a temperature-controlled preform 12 held therein. For the biaxial expansion of the preform 12 in the limits of the blow mold 38, a fluid supply line 42 is connected to the interior of the preform 12. The fluid supply line 42 is controlled by a switching valve 44, which is connected by means of a control line 54 to a control unit 46 of a blow molding machine 10. The control unit 46 is in turn configured and designed to transmit control signals via the control line 54 to the valve 44 on the basis of pre-determinable control parameters, to move the valve 44 into an open position or a closed position, respectively. In the open position of the valve 44, the fluid line 42 is connected to a pressurized container 40 arranged upstream of the valve 44, so that a forming fluid provided under pressure in the pressurized container 40, for example, a blowing gas or a forming liquid, can be introduced into the interior of the preform 12. The valve 44 can preferably be designed as a bus-capable valve. If a bus-capable valve is used, the control line 54 can be designed as a bus line. Moreover, it suggests itself that the machine controller provided for the control of the blow molding machine 10 be used as the control unit 46. The control unit 46 can also be a control unit integrated into the machine controller.

To assist the biaxial expansion of the preform 12, a stretching rod 50, which is displaceably mounted in the axial direction of the preform 12 and is movable into the interior of the preform 12 by plunging into the orifice region 18 of the preform 12, can be arranged on the forming station 16. A stretching rod drive configured for the axial displacement of the stretching rod 50 is connected by means of a control line 58 to the control unit 46. The control unit 46 can transmit control signals via the control line 58 to the stretching drive in dependence on specified control parameters, in order to trigger an axial displacement of the stretching rod 50.

FIG. 2 furthermore shows a sensor 48 connected via a control line 56 to the control unit 46, which sensor is configured and designed to metrologically acquire a property of a container 14 formed using a specific forming station 16. The symbolically shown sensor line 52 represents the measurement connection between the sensor 48 and the finished container 14. The metrological acquisition of properties of the finished container 14 can be carried out in a contactless or contacting manner. Primarily, a wall thickness measurement or a measurement of the material distribution is intended in the sensorial acquisition of the finished container. The wall thickness or material distribution may be carried out, for example, by optical measuring methods, i.e., in particular operating using light waves, and/or acoustic measuring methods, i.e., in particular operating using sound waves. It is obvious that other properties, for example, the surface structure or the profile of the finished container, can also be metrologically acquired. Other measuring methods adapted to the property to be acquired can accordingly also be applied. It is furthermore obvious that not only a single sensor but rather also multiple sensors can be provided for acquiring properties of the finished container 14.

By way of feedback of the properties acquired using the sensor 48 of a container 14 produced using a specific forming station 16 to the control unit 46, a comparison between the acquired properties of the finished container 14 and container reference properties can be performed with the aid of the control unit 46. The container reference properties can be stored for this purpose in a memory readable by the control unit 46. Upon occurrence of a difference between the acquired properties and the container reference properties, a change of the control parameters provided for the control of the valve 44 and/or the stretching rod 50 can be performed to influence the forming process of a specific forming station 16 in such a way that the properties of containers 14 subsequently produced using the forming station 16 at least approximately correspond to the container reference properties. The control parameters influencing the forming process, which can be used, for example, for controlling the valve 44 or the stretching rod 50, are preferably specified regulated by a closed control loop, so that deviations between the acquired properties and the container reference properties can be reduced particularly rapidly and continuously.

LIST OF REFERENCE NUMERALS 10 blow molding machine
12 preform
14 container
16 forming station
18 orifice region
20 working wheel
22 supply unit
24 transfer wheel
26 temperature control device
28 heating elements
30 transport unit
32 transfer wheel
34 removal wheel
36 output line
38 blow mold
40 pressurized container
42 fluid line
44 valve
46 control unit
48 sensor
50 stretching rod
52 sensor line
54 control line
56 control line
58 control line

The invention claimed is:

1. A method for producing a finished container from a preform made of thermoplastic material with a blow molding machine that includes at least one temperature control device and a forming device having at least two forming stations, the method comprising:
heating the preform to a temperature for radial and axial expansion with the temperature control device on the basis of at least one selected first control parameter to obtain a heated preform;
forming the heated preform into the finished container in one of the at least two forming stations on the basis of a second control parameter that is individually specified for the respective one of the at least two forming stations;

metrologically acquiring at least one property of the finished container, and in consideration of the metrologically acquired at least one property, adjusting the second control parameter that is individually specified for the respective one of the at least two forming stations to influence containers subsequently formed in the same respective one of the at least two forming stations to meet predetermined container specifications;

monitoring a time behavior of individually specified second control parameter for the respective one of the at least two forming stations, and in consideration of the monitored time behavior, deriving a change in a wear state of a component of the respective one of the at least two forming stations; and having the component of the respective one of the at least two forming stations serviced or replaced, prior to failure of the component, based on the derived change in the wear state of the component.

2. The method according to claim 1, wherein the at least one property metrologically acquired during or after the forming of the finished container is continuously acquired.

3. The method according to claim 2, wherein the at least one property is compared to a reference property, and wherein the individually specified second control parameter is automatically adjusted in a closed control loop on the basis of the comparison between the continuously acquired property and the reference property.

4. The method according to claim 3, wherein, in addition to the individually specified second control parameter at least one further second individually specified control parameter and/or the at least one first control parameter is/are automatically adjusted in the closed control loop.

5. The method according to claim 1, wherein the individually specified second control parameter comprises one or more control parameters for pre-blowing valves of the forming stations.

6. The method according to claim 1, wherein the individually specified second control parameter comprises one or more control parameters for main blowing valves of the forming stations.

7. The method according to claim 1, wherein the individually specified second control parameter comprises one or more control parameters for stretching drives of the forming stations.

8. The method according to claim 1, wherein the individually specified second control parameter comprises one or more control parameters for throttle valves of the forming stations.

9. The method according to claim 1, wherein the at least one metrologically acquired property is a wall thickness or a wall thickness distribution or a section weight of the finished container.

10. The method according to claim 1, wherein the derived change in the wear state of the component is extrapolated to estimate a future wear state of the component.

11. The method according to claim 10, further comprising scheduling maintenance or replacement of the component based on the estimate of the future wear state of the component.

12. The method according to claim 1, wherein the forming stations each comprise at least one valve, wherein before installation of the at least one valve into each respective forming station, a valve characteristic of the valve is determined to obtain an initial value to specify an individual second control parameter associated with the valve.

* * * * *